United States Patent [19]

Lovison

[11] Patent Number: 4,793,635
[45] Date of Patent: Dec. 27, 1988

[54] RADIOPAQUE GRAPHICS

[76] Inventor: Douglas I. Lovison, 3468 Sitio Baya, Carlsbad, Calif. 92009

[21] Appl. No.: 119,022

[22] Filed: Nov. 10, 1987

[51] Int. Cl.⁴ .................... B42D 15/00; B42D 5/00; B42F 21/06

[52] U.S. Cl. .................................. 283/74; 283/82; 283/91

[58] Field of Search ............... 283/74, 75, 82, 91, 283/94, 107; 428/13, 916, 928; 156/209, 145; 354/105

[56] References Cited

U.S. PATENT DOCUMENTS

| | | | |
|---|---|---|---|
| 2,258,891 | 10/1941 | Harrington | 283/74 |
| 3,925,585 | 12/1975 | Aoyagi | 283/74 |
| 4,032,679 | 6/1977 | Aoyagi | 283/74 |
| 4,423,415 | 12/1983 | Goldman | 283/82 |
| 4,499,126 | 2/1985 | Suzuki et al. | 283/74 |
| 4,511,616 | 4/1985 | Pitts et al. | 283/82 |
| 4,652,015 | 3/1987 | Crane | 283/91 |

FOREIGN PATENT DOCUMENTS 2068295 8/1981 United Kingdom ............ 283/82

OTHER PUBLICATIONS

"Buyers Guide" intro-trade Medical Corporation Order Desk, 1987.

Primary Examiner—Frank T. Yost
Assistant Examiner—Paul M. Heyrana, Sr.
Attorney, Agent, or Firm—Workman, Nydegger & Jensen

[57] ABSTRACT

An identifier for use in radiology comprises a plastic carrier having thermoformed recesses. A radiopaque material is deposited in the recesses and a sheet is adhesively attached to the carrier to hold the radiopaque material in the recesses. The sheet may be provided with an adhesive which will hold the identifier against or near an object while the object is being X-rayed.

7 Claims, 1 Drawing Sheet

RADIOPAQUE GRAPHICS

BACKGROUND OF THE INVENTION

The present invention pertains to graphics and markings which are useful for identifying the subject of a picture and the orientation of the subject at the time the picture was taken. More specifically, the present invention pertains to identifiers which are useful in X-ray photography. The present invention is particularly, but not exclusively, useful in identifying the date of the X-ray, the patient being X-rayed and the orientation of the particular part of the patient being X-rayed.

DESCRIPTION OF THE PRIOR ART

Radiophotography is frequently used in the medical field for diagnostic purposes. As a means for viewing the interior of a body it is efficient and efficacious and its basic procedures and techniques are all well known in the art. As can be well appreciated, since there are no inherent identifiers within the body, when X-ray pictures are taken there is a need to identify the patient being X-rayed and the orientation of the particular part of the patient's body being X-rayed.

In addition to the medical arts, radiophotography is also used extensively in engineering applications which require viewing the interior of other structures. Accordingly, although the disclosure herein focuses on the medical applications of radiology, the present invention should not be so restricted. Indeed, the present invention is efficacious for use in all applications of radiophotography where the subject matter being radiophotographed needs to be identified.

Under presently accepted practices, lead characters or fonts are used to indicate the indentity of the patient and the orientation of the part of the patient's body being X-ray photographed. Typically, these characters are similar to those marketed in the Buyer's Guide of Intra-Trade Medical Corp. With such equipment, a plate or holder is provided on which the characters are arranged as desired by the operator. This operation generally requires transferring the lead characters from a compartmentalized tray and affixing them to the plate. Upon completion of the radiophotography the lead characters are removed from the plate and returned to their respective compartments on the tray. This procedure can be time consuming and labor intensive. Further, the lead characters are cumbersome to work with and are relatively expensive.

The present invention recognizes that there is a need for radiopaque identifiers which are useful for the above-stated purposes yet which are sufficiently inexpensive to be disposed of after use, if desired. Further, the present invention recognizes that identifiers which can be easily stored and easily transferred to an identification plate will result in significant advantages in efficiency and efficacy over the present systems using lead characters. Additionally, the present invention recognizes that materials having a greater radiopaque density than lead can be used with an appropriate carrier to give greater resolution and consequent easier reading of identification symbols on X-ray photographs.

Accordingly, it is an object of the present invention to provide a radiopaque identifier which is easily transferred from a storage substrate to an identification plate for subsequent use in radiophotography. Another object of the present invention is to provide an identifier which is reusable but which is also sufficiently inexpensive to be disposable, if desired. Still another object of the present invention is to provide radiopaque indentifiers which are easily stored and easily transported. Yet another object of the present invention is to provide a radiopaque identifier which is easily manufactured, easily used and which is relatively very cost effective.

SUMMARY OF THE INVENTION

The preferred embodiment of the identifier of the present invention comprises a thermoformed plastic carrier having recesses which are individually shaped to represent alphanumeric characters and other designs. A radiopaque material, preferably a tungsten-epoxy mixture, is deposited in the recesses and a sheet having an adhesive substance on both of its sides is adhesively attached to the carrier to help hold the radiopaque material in the recesses. A release paper removably adheres to the side of the sheet opposite the carrier until the identifier is to be removed and transferred to a plate or object on which it will be X-ray photographed. The release paper may hold a plurality of identifiers each of which are separated from the others by a cut. Thus, each identifier can be individually removed from the release paper and used in accordance with the desires of the operator.

The novel features of this invention as well as the invention itself, both as to its organization and operation, will be best understood from the accompanying drawings taken in conjunction with the accompanying description in which similar reference characters refer to similar parts and in which:

DESCRIPTION OF THE PREFERRED EMBODIMENT

Figure 1:
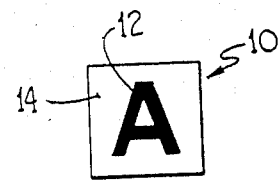
FIG. 1 is a top view of an identifier.

Referring initially to FIG. 1, it will be seen that in accordance with the present invention an identifier, generally designated 10, has a radiopaque portion 12 and a nonradiopaque portion 14. As shown in FIG. 1, radiopaque portion 12 of a sample identifier 10 is configured as the letter "A".

Figure 2:
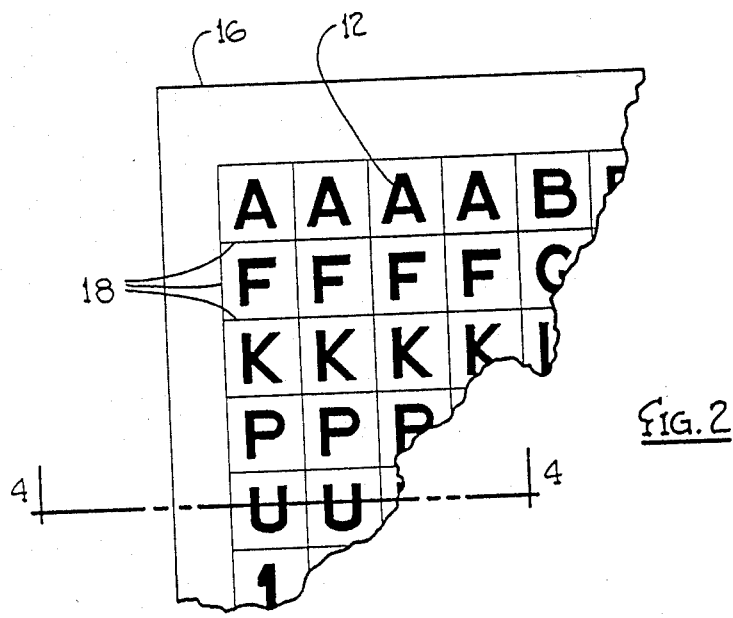
FIG. 2 is a top view of a sheet of individually removable identifiers.
Figure 3:
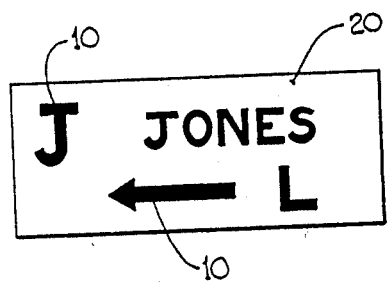
FIG. 3 is a top view of a plate with identifiers attached thereto.

FIG. 2 shows that a plurality of identifiers can be placed together on a substrate 16 where they are separated from each other by a series of cuts 18 which allow individual identifiers 10 to be removed from the substrate 16. FIG. 3 shows that identifiers 10, when removed from substrate 16, can be arranged as desired on a nonradiopaque plate 20. Plate 20 can then be used in any manner well known in the art to identify an object (not shown) which is being X-rayed.

Figure 4:
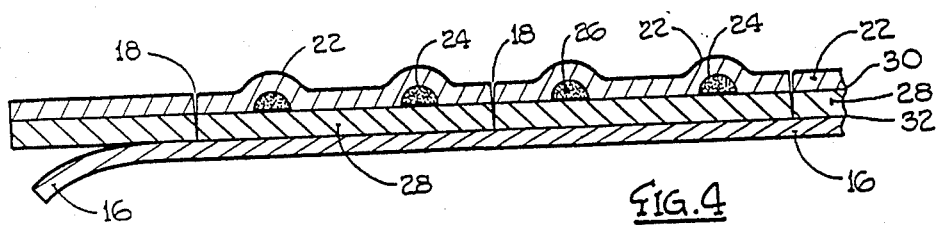
FIG. 4 is a side cross-sectional view of identifiers as seen along the line 4—4 in FIG. 2.

The specific structure for an identifier 10 of the present invention will be best understood by reference to FIG. 4 in which it can be seen that identifiers 10 comprise a nonradiopaque carrier 22. Each carrier 22 is formed with a recess 24 which is configured into the desired alphanumeric character or design and a radiopaque material 26 is deposited in recess 24. A sheet 28 is adhesively joined to carrier 22 at the interface 30 therebetween. It will also be seen in FIG. 4 that sheet 28 covers recesses 24 to help hold radiopaque material 26 therein. A release paper provides the substrate 16 for identifiers 10 and is adhesively attached to sheet 28 at the interface 32 therebetween. Release paper or substrate 16 is preferably a waxed paper well known in the pertinent art which can be removed from identifier 10 according to the desires of the operator. In FIG. 4, a portion of substrate 16 is shown peeled away from sheet 28. It will be appreciated that each identifier 10 can be individually lifted off sheet 28.

In the manufacture of identifier 10, carrier 22 is thermoformed in a manner well known in the pertinent art to create recesses 24 in the desired shapes. Carrier 22 can be an approximately ⅛th inch thick layer of any nonradiopaque plastic which is well known in the pertinent art and which is easily thermoformed into molds having cavities (not shown) of approximately ⅛th inch depth. A mixture of epoxy-resin and tungsten granules approximately 10 microns in size is deposited in recesses 24. This is accomplished in a manner similar to the well known process used in silk screening. Specifically, the tungsten-epoxy mixture can be placed on the side of carrier 22 having recesses 24 and the mixture smoother into recesses 24 with a squeegee. The tungsten-epoxy mixture is then allowed to surface dry and set-up in the recesses 24.

A double coated adhesive sheet 28 is adhesively attached to carrier 22. Preferably, sheet 28 is similar to the product manufactured by 3M and marketed under the mark Scotch, 3M Y9415PC. Importantly, sheet 28 should have a high tack side and a low tack side similar to that incorporated in the above-referenced 3M product. With this double coated adhesive sheet 28, the high tack side, i.e. the side having the greater adhesive ability, is joined to carrier 22. It will be noted that the low tack side of sheet 28 should remain joined with the release paper substrate 16 which is included with the product sold by 3M.

Once sheet 28 has been joined to carrier 22, the individual characters formed by recesses 24 can be separated by a die cut process well known to the skilled artisan as a "kiss" cut. Specifically, cuts 18 are made in a manner as seen in FIG. 4 where each cut 18 extends only through carrier 22 and sheet 28, but does not proceed through substrate 16.

While the particular radiopaque graphic identifier as herein shown and disclosed in detail is fully capable of obtaining the objects and providing the advantages herein before stated, it is to be understood that it is merely illustrative of the presently preferred embodiment of the invention and that no limitations are intended to the details of construction or design herein shown other than as defined in the appended claims.

I claim:

1. A transferable identifier for placement on a plate during a radiology procedure which comprises:
   a plastic carrier having a recess thermoformed into an alphanumeric shape;
   a radiopaque material deposited within said recess;
   a sheet attached to said carrier to hold said radiopaque material in said recess; and
   an adhesive deposited on said sheet to hold said identifier in place on said plate.

2. An identifier as cited in claim 1 further comprising a release paper held by said adhesive means against said sheet and removable therefrom for placement of said identifier on said plate.

3. An identifier as cited in claim 2 wherein said carrier is formed with a plurality of carriers each of which has a radiopaque material deposited in said recess thereof.

4. An identifier as cited in claim 3 wherein said sheet is attached to said carrier by an adhesive material.

5. An identifier as cited in claim 4 wherein said carrier is a thermoformable plastic.

6. An identifier as cited in claim 5 wherein said radiopaque material is tungsten.

7. A method for manufacturing a radiopaque identifier for use in X-ray photography which comprises the steps of:
   a. Thermo-forming a plastic carrier to establish alphanumeric-shaped recesses thereon;
   b. Depositing a tungsten-epoxy mixture into said recesses;
   c. Allowing said mixture to surface dry; and
   d. Attaching a substrate to said carrier with said mixture held therebetween.

* * * * *